United States Patent
Yamasaki et al.

(10) Patent No.: US 11,634,157 B2
(45) Date of Patent: Apr. 25, 2023

(54) AUTOMATED DRIVING ENABLED VEHICLE

(71) Applicant: SUBARU CORPORATION, Tokyo (JP)

(72) Inventors: Kentarou Yamasaki, Tokyo (JP); Makoto Kinoshita, Tokyo (JP); Keisuke Takayama, Tokyo (JP); Yuta Muramatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 148 days.

(21) Appl. No.: 16/987,174

(22) Filed: Aug. 6, 2020

(65) Prior Publication Data

US 2021/0094573 A1 Apr. 1, 2021

(30) Foreign Application Priority Data

Sep. 26, 2019 (JP) .............................. JP2019-175682

(51) Int. Cl.
*B60W 60/00* (2020.01)
*B60Q 1/50* (2006.01)

(52) U.S. Cl.
CPC ........... *B60W 60/0015* (2020.02); *B60Q 1/50* (2013.01); *B60W 60/0053* (2020.02)

(58) Field of Classification Search
CPC ......... B60W 60/0015; B60W 60/0053; B60W 50/14; B60W 50/082; B60W 2050/0072; B60W 2050/146; B60Q 1/50; B60Q 1/2607
See application file for complete search history.

(56) References Cited

U.S. PATENT DOCUMENTS

| | | | |
|---|---|---|---|
| 8,930,085 B2 | 1/2015 | Takeuchi et al. | |
| 9,969,320 B2 | 5/2018 | Kim et al. | |
| 10,053,001 B1 | 8/2018 | Nabbe et al. | |
| 10,195,902 B1 | 2/2019 | Lee et al. | |

(Continued)

FOREIGN PATENT DOCUMENTS

| | | | | |
|---|---|---|---|---|
| EP | 3 369 621 A1 | 9/2018 | | |
| GB | 2571149 A | * 8/2019 | ............ | B60W 30/06 |

(Continued)

OTHER PUBLICATIONS

U.S. PTO Non-Final Office Action issued in related U.S. Appl. No. 16/983,674, dated Apr. 29, 2021.

(Continued)

*Primary Examiner* — Redhwan K Mawari
(74) *Attorney, Agent, or Firm* — McDermott Will & Emery LLP (57) ABSTRACT

An automated driving enabled vehicle includes a travel controller, an automated driving indicator lamp, and a lamp controller. The automated driving indicator lamp is configured to be switched on perceptibly from outside the vehicle on the occasion of automated driving. The lamp controller is configured to start a lighting control of the automated driving indicator lamp that has been off, before the vehicle makes a departure by the automated driving, on the condition that the vehicle is about to make the departure by the automated driving from a parked or stopped state with the automated driving indicator lamp off.

8 Claims, 7 Drawing Sheets

(56) References Cited

U.S. PATENT DOCUMENTS

| | | |
|---|---|---|
| 11,180,073 B2 | 11/2021 | Madril et al. |
| 2017/0057542 A1 | 3/2017 | Kim et al. |
| 2017/0225567 A1 | 8/2017 | Tsuda |
| 2017/0229053 A1 | 8/2017 | Ishizuka et al. |
| 2017/0334455 A1 | 11/2017 | Asakura et al. |
| 2018/0017969 A1 | 1/2018 | Nagy et al. |
| 2018/0086260 A1 | 3/2018 | Barillot et al. |
| 2018/0173237 A1 | 6/2018 | Reiley et al. |
| 2018/0304804 A1 | 10/2018 | Tatara et al. |
| 2018/0312106 A1 | 11/2018 | Tatara et al. |
| 2018/0334088 A1* | 11/2018 | Salter .................. B60Q 1/2661 |
| 2018/0356818 A1 | 12/2018 | Arai et al. |
| 2019/0066548 A1 | 2/2019 | Dellock et al. |
| 2019/0084585 A1 | 3/2019 | Fritz et al. |
| 2019/0111784 A1 | 4/2019 | Tsuda |
| 2019/0168664 A1 | 6/2019 | Tatara et al. |
| 2019/0210517 A1 | 7/2019 | Baker et al. |
| 2019/0248421 A1* | 8/2019 | Jacobsthal ............. B60H 1/245 |
| 2019/0270406 A1 | 9/2019 | Dubey et al. |
| 2020/0031274 A1* | 1/2020 | Redick .................... B60Q 1/50 |
| 2020/0130573 A1* | 4/2020 | Ito ......................... B60J 1/2016 |
| 2020/0156532 A1* | 5/2020 | Lee ....................... G01S 7/4808 |
| 2020/0307648 A1 | 10/2020 | Noguchi et al. |
| 2021/0201885 A1 | 7/2021 | Bastyr et al. |

FOREIGN PATENT DOCUMENTS

| | | |
|---|---|---|
| JP | 2018-032433 A | 3/2018 |
| JP | 2019-064471 A | 4/2019 |

OTHER PUBLICATIONS

U.S. PTO Notice of Allowance issued in related U.S. Appl. No. 16/983,674, dated Sep. 2, 2021.

U.S. PTO Notice of Allowance issued in related U.S. Appl. No. 16/987,135 dated Jun. 6, 2022.

U.S. PTO Non-Final Office Action issued in related U.S. Appl. No. 16/987,077, dated Jun. 22, 2022.

U.S. PTO Non-Final Office Action issued in related U.S. Appl. No. 16/983,614, dated Dec. 29, 2021.

U.S. PTO Non-Final Office Action issued in related U.S. Appl. No. 16/985,953, dated Apr. 22, 2022.

U.S. PTO Non-Final Office Action issued in related U.S. Appl. No. 16/985,909, dated Dec. 2, 2022.

U.S. PTO Notice of Allowance issued in related U.S. Appl. No. 16/985,953, dated Jan. 5, 2023.

U.S. PTO Final Office Action issued in related U.S. Appl. No. 16/985,953, dated Sep. 21, 2022.

U.S. PTO Notice of Allowance issued in related U.S. Appl. No. 16/987,077, dated Oct. 4, 2022.

* cited by examiner

AUTOMATED DRIVING ENABLED VEHICLE

CROSS-REFERENCE TO RELATED APPLICATIONS

This application claims priority from Japanese Patent Application No. 2019-175682 filed on Sep. 26, 2019, the entire contents of which are hereby incorporated by reference.

BACKGROUND

The technology relates to an automated driving enabled vehicle.

As to vehicles, research and development of automated driving, or automation of vehicle travel, has been in progress.

For example, vehicles in the future are expected to travel to a destination by an automatic control in response to setting of the destination, and to stop and park at the destination.

SUMMARY

An aspect of the technology provides an automated driving enabled vehicle including a travel controller, an automated driving indicator lamp, and a lamp controller. The travel controller is configured to control travel of the vehicle while switching a travel control state between automated driving and manual driving. The automated driving indicator lamp is configured to be switched on perceptibly from outside the vehicle on the occasion of the automated driving. The lamp controller is configured to switch on the automated driving indicator lamp to indicate that the travel control state is the automated driving, during execution of the automated driving in which the travel controller controls the travel of the vehicle by the automated driving. The lamp controller is configured to start a lighting control of the automated driving indicator lamp that has been off, before the vehicle makes a departure by the automated driving, on the condition that the vehicle is about to make the departure by the automated driving from a parked or stopped state with the automated driving indicator lamp off.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

The aims of automated driving enabled vehicles may possibly include making appropriate selection of a travel path, a safety check of a course, and an avoidance control of uncertainties, to travel to the destination without an unanticipated incident.

Executing such a control for safer travel, however, would not guarantee safety to 100% perfection. The possibility is that even such a travel control by automated driving enabled vehicles will provide only a limited level of safety.

For example, automated driving enabled vehicles may include an automated driving indicator lamp. Automated driving enabled vehicles may switch on the automated driving indicator lamp perceptibly from outside them, in a case where they are executing automated driving. Reference is made to, for example, Japanese Unexamined Patent Application Publication (JP-A) Nos. 2018-032433 and 2019-064471.

Such an automated driving enabled vehicle switching on the automated driving indicator lamp during the execution of the automated driving makes it possible for occupants of surrounding vehicles or nearby pedestrians to grasp the situation that the vehicle is executing the automated driving, allowing the occupants or the pedestrians to take an action or a prior countermeasure in response to the situation. The surrounding vehicles may be on a road or a lane on which the automated driving enabled vehicle is traveling.

As described, a travel control of automated driving enabled vehicles themselves provides only a limited level of safety in their travel environment. Automated driving enabled vehicles owe their enhanced safety to cooperation with surrounding vehicles and pedestrians.

On the other hand, keeping automated driving indicator lamps of automated driving enabled vehicles on during the execution of the automated driving contributes to a concern about power consumption of the automated driving indicator lamps. Such power consumption of the automated driving indicator lamp may be possible counteracted by switching off the automated driving indicator lamp in a case where, for example, the vehicle executing the automated driving is parked or stopped along, for example, a roadside.

However, if the vehicle is parked or stopped with the automated driving indicator lamp kept off, and then, makes a departure by the automated driving from the parked or stopped state, it follows that the vehicle parked or stopped with the automated driving indicator lamp off appears to abruptly start moving. This may cause nearby pedestrians and surrounding vehicles difficulties in recognizing the abrupt movement. This is also the case when the vehicle starts to switch on the automated driving indicator lamp while making a departure by the automated driving.

As described, automated driving enabled vehicles have had room for improvements.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

First Embodiment

Figure 1A:
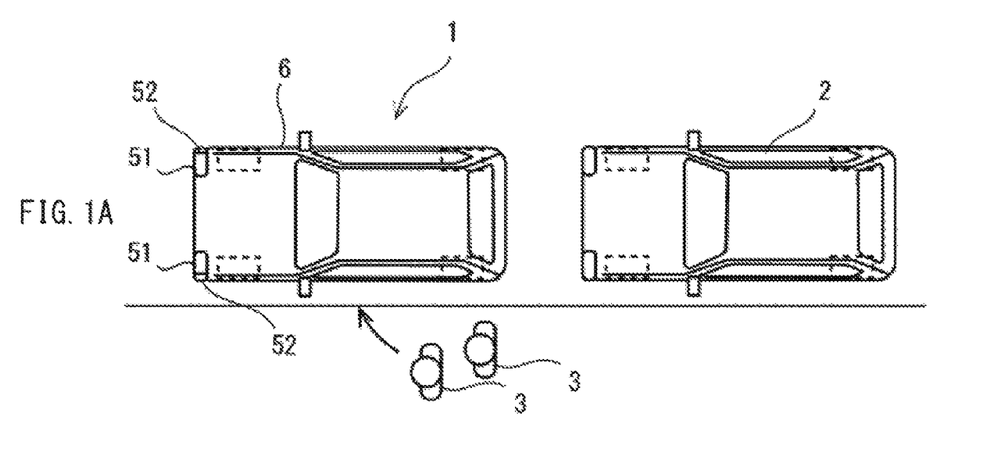
FIGS. 1A to 1C are schematic diagrams of an automated driving enabled automobile according to an embodiment of the technology.
Figure 1B:
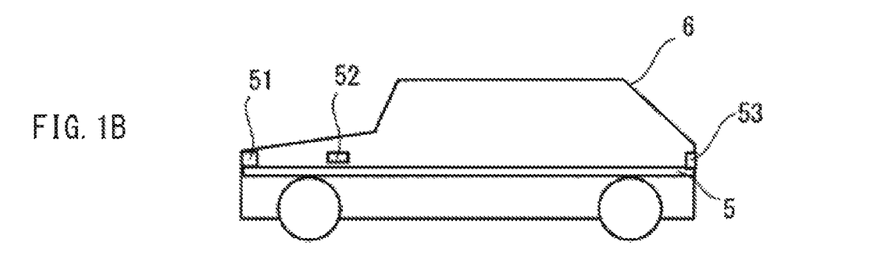
Figure 1C:
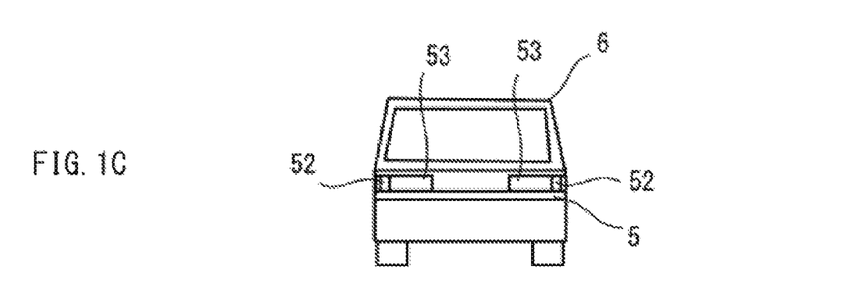

FIGS. 1A to 1C are schematic diagrams of an automated driving enabled automobile 1 according to an embodiment of the technology. In the following, the automated driving enabled automobile 1 is also simply referred to as an "automobile 1".

FIG. 1A is a top view of the automobile 1. In FIG. 1A, the automobile 1 is assumed to be stopped along a roadside of a driveway, waiting for passengers 3 to get in. Behind the automobile 1, a surrounding automobile 2 is stopped. The passengers 3 or other persons are assumed to get in the automobile 1 from a walkway of the roadside. FIG. 1B is a side view of the automobile 1. FIG. 1C is a rear view of the automobile 1.

Referring to FIGS. 1A to 1C, the automobile 1 is configured to travel while switching between automated driving and manual driving. The automobile 1 includes an automated driving indicator lamp 5. The automated driving indicator lamp 5 is configured to be switched on, on the occasion of the automated driving.

The automated driving indicator lamp 5 may be a lamp that is switched on, to indicate that the automated driving is in execution. The automated driving indicator lamp 5 may circumscribe a vehicle body 6 of the automobile 1, for example, on all sides, i.e., front, rear, right and left sides, of the vehicle body 6. This makes it possible for the passenger 3 around the automobile 1 and the passenger 3 of the surrounding automobile 2 to visually recognize, from outside the automobile 1, illumination of the automated driving indicator lamp 5 on the occasion of the execution of the automated driving. Switching on the automated driving indicator lamp 5 on the occasion of the automated driving makes it possible to receive cooperation with the passenger 3 near the automobile 1 and the passenger 3 of the surrounding automobile 2. Hence, it is possible to expect a higher level of safety than provided solely by a travel control of the automobile 1 itself.

The automated driving indicator lamp 5 may have other configurations than described above. For example, the automated driving indicator lamp 5 may be provided separately on four corners, i.e., front right, front left, rear right, and rear left corners, of the vehicle body 6. In one alternative, the automated driving indicator lamp 5 may be provided along an outer periphery of a roof panel over a vehicle cabin. In another alternative, the automated driving indicator lamp 5 may protrude from the roof panel.

The automated driving indicator lamp 5 is configured to be switched on, in a case where the automobile 1 is traveling by the automated driving. On the other hand, keeping the automated driving indicator lamp 5 on during the execution of the automated driving may cause an increase in power consumption of the automated driving enabled automobile 1. In particular, for electrically powered automobile 1, a steady increase in power consumption during the execution of the automated driving may shorten its cruising range and directly affect its travel performance. This may be possibly counteracted by switching off the automated driving indicator lamp 5 for purpose of reduction in the power consumption, in a case where, for example, the automobile 1 is parked or stopped by the automated driving, waiting for the passenger 3 to get in.

On the other hand, if the automobile 1 is parked or stopped with the automated driving indicator lamp 5 off, and then, abruptly starts traveling while switching on the automated driving indicator lamp 5, those around the automobile 1, e.g., other passengers, pedestrians, and/or occupants of the surrounding automobile 2 may possibly fail to appropriately cope with the abrupt movement of the automobile 1.

As described, the automated driving enabled automobile 1 has had room for improvements.

Figure 2:
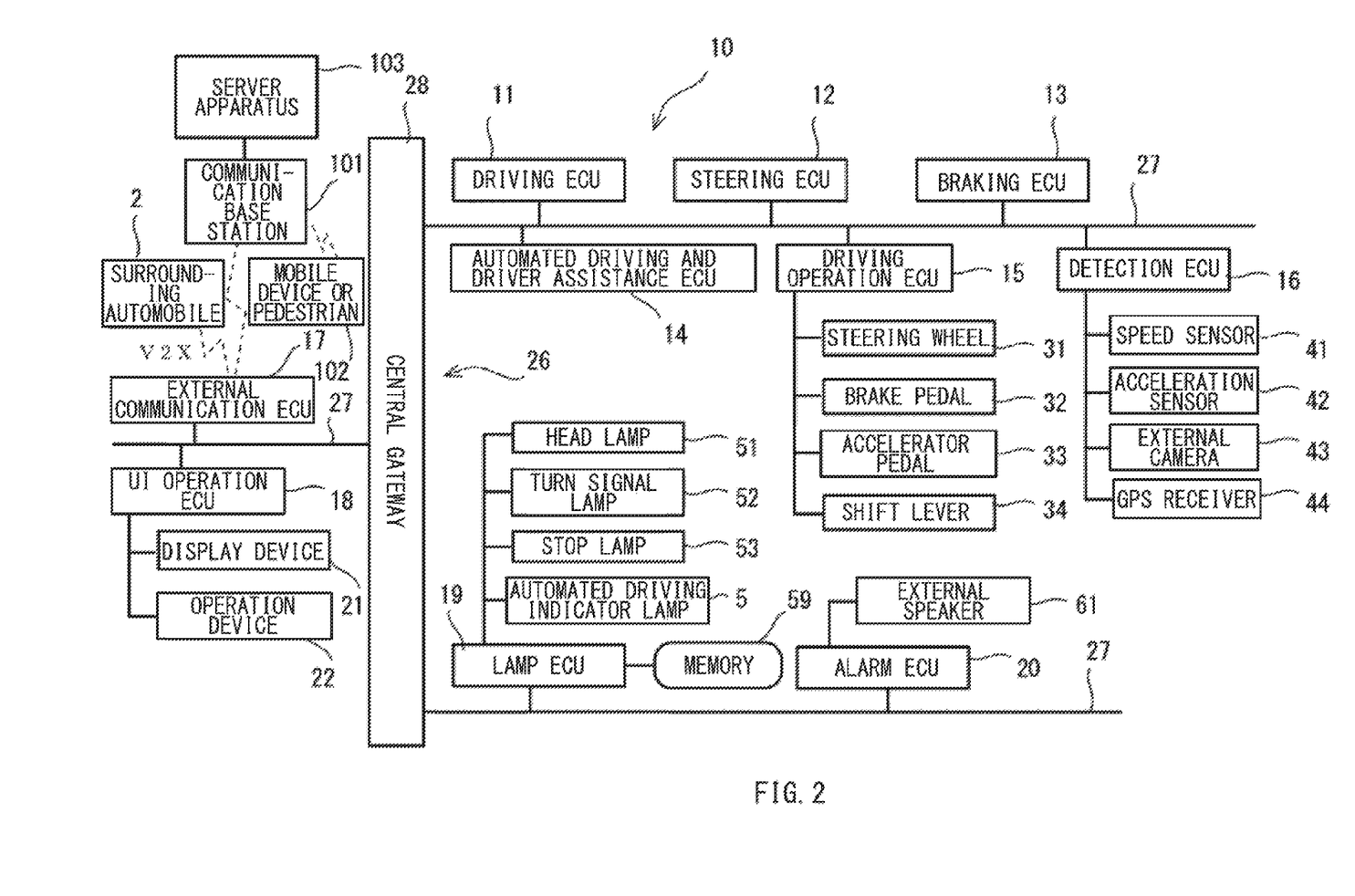
FIG. 2 is a block diagram of a control system of the automobile illustrated in FIGS. 1A to 1C.

FIG. 2 illustrates a control system 10 of the automobile 1 in FIGS. 1A to 1C. The control system 10 of the automobile 1 may include a plurality of controllers that are installed in their respective control ECUs (electronic control units). In FIG. 2, each of the plurality of the controllers is typically represented by a corresponding one of the control ECUs. Each of the plurality of the controllers may include not only the control ECU but also a storage member, input and output ports, a timer, and an internal bus to which the control ECU, the storage member, the input and output ports, and the timer are coupled. The storage member may hold, for example, a control program and data. The input and output ports may be coupled to an object to be controlled, and/or to a device that detects a state of the object to be controlled. The timer may measure time and timing.

As illustrated in FIG. 2, in one specific but non-limiting example, the control ECUs may include a driving ECU 11, a steering ECU 12, a braking ECU 13, an automated driving and driver assistance ECU 14, a driving operation ECU 15, a detection ECU 16, an external communication ECU 17, a UI operation ECU 18, a lamp ECU 19, and an alarm ECU 20. The control system 10 of the automobile 1 may further include other undepicted control ECUs.

The plurality of the control ECUs may be coupled to a vehicle network 26 adopted by the automobile 1 such as a CAN (controller area network) and a LIN (local interconnect network). The vehicle network 26 may include a plurality of bus cables 27 and a CGW (central gateway) 28. The plurality of the bus cables 27 is able to be coupled to the plurality of the control ECUs. The central gateway 28 may serve as a relay device to which the plurality of the bus cables 27 is coupled. To the plurality of the control ECUs, their respective IDs (identifications) may be assigned. The IDs may differ from one another and serve as identification information. Each of the control ECU may output, basically on a periodical basis, notification data to one or more of the other control ECUs. To the notification data, the ID of the sender control ECU and the ID of the receiver control ECU may be attached. The other control ECUs than the sender control ECU may monitor the respective ones of the bus cables 27 to which they are coupled. For example, in a case where any one of the other control ECUs finds the ID of the receiver control ECU to match its own ID, the relevant control ECU may acquire the notification data and execute processing based on the notification data. The central gateway 28 may monitor each of the plurality of the bus cables 27 coupled to the central gateway 28. In a case where the central gateway 28 detects one or more of the other control ECUs coupled to any one of the bus cables 27 different from the bus cable 27 to which the sender control ECU is coupled, the central gateway 28 may supply the notification data to the relevant one of the bus cables 27. With such relay processing by the central gateway 28, it is possible for each of the control ECUs to send the notification data to one or more of the other control ECUs coupled to respective ones of the bus cables 27 different from the bus cable 27 to which the sender control ECU is coupled. It is also possible for each of the control ECUs to receive the notification data from any one of the control ECUs coupled to the corresponding one of the bus cables 27 different from the bus cable 27 to which the receiver control ECU is coupled.

The external communication ECU 17 may perform wireless communication with, for example, a communication base station 101 and a communication device of the surrounding automobile 2. The communication base station 101 and the surrounding automobile 2 are present outside the automobile 1. The communication base station 101 may be, for example, a base station of an ADAS (advanced driver assistance system) communication network, or alternatively, the communication base station 101 may be, for example, a base station of a carrier communication network. The base station of the carrier communication network may communicate not only with the communication device of the surrounding automobile 2 but also with a mobile device 102 held by the passenger 3. The external communication ECU 17 may be divided into a plurality of subunits for respective categories of partners with whom the external communication ECU 17 communicates directly, and the subunits may be provided in the automobile 1. The communication base station 101, the communication device of the surrounding automobile 2, and the mobile device 102, together with a server apparatus 103, may constitute a traffic system 100. The external communication ECU 17 may transmit and receive communication data to and from the server apparatus 103, the surrounding automobile 2, or the mobile device 102 by directly performing wireless communication with the communication base station 101 or the communication device of the surrounding automobile 2.

To the UI operation ECU 18, a display device 21 and an operation device 22 may be coupled as, for example, a user interface device with a passenger of the automobile 1. The display device 21 may include, for example, a liquid crystal device or a video projection device, or both. The operation device 22 may be, for example, a touchscreen, a keyboard, or a contactless operation sensing device, or any combination thereof. The display device 21 and the operation device 22 may be mounted on, for example, an inner surface of the vehicle cabin in which the passenger rides. The UI operation ECU 18 may acquire the notification data from the vehicle network 26, and display the notification data on the display device 21. The UI operation ECU 18 may output, to the vehicle network 26, an operation input made on the operation device 22. Moreover, the UI operation ECU 18 may perform processing based on the operation input and incorporate a result of the processing in the notification data. The UI operation ECU 18 may provide, for example, display of a navigation screen on the display screen 21. The navigation screen may allow for setting of, for example, a destination. The UI operation ECU 18 may search a path to the destination selected by the operation input. The UI operation ECU 18 may incorporate data regarding the path in the notification data. The data regarding the path may include attribute information regarding, for example, lanes of roads to be used to move from a current position to the destination.

To the driving operation ECU 15, coupled may be operation members that allow the passenger to control the travel of the automobile 1. Specific but non-limiting examples of the operation members may include a steering wheel 31, a brake pedal 32, an accelerator pedal 33, and a shift lever 34. If any operation is made on the operation members, the driving operation ECU 15 may output, to the vehicle network 26, the notification data including, for example, presence or absence of the operation and an amount of the operation. Moreover, the driving operation ECU 15 may execute processing regarding the operation on the operation members, and incorporate a result of the processing in the notification data. For example, if any operation is made on the accelerator pedal 33, with presence of surrounding moving bodies and/or fixed objects in a traveling direction of the automobile 1, the driving operation ECU 15 may make a determination that the operation on the accelerator pedal 33 is an abnormal operation. The driving operation ECU 15 may incorporate the result of the determination in the notification data.

To the detection ECU 16, coupled may be detection members that detect a travel state of the automobile 1. Specific but non-limiting examples of the detection members may include a speed sensor 41, an acceleration sensor 42, an external camera 43, and a GPS receiver 44. The speed sensor 41 may detect a speed of the automobile 1. The acceleration sensor 42 may detect an acceleration rate of the automobile 1. The external camera 43 may capture an image of external surroundings of the automobile 1, and include, for example, a stereo camera. The GPS receiver 44 may serve as a GNSS (global navigation satellite system) receiver that detects a position of the automobile 1. The detection ECU 16 may acquire detection information from the detection members. The detection ECU 16 may output the notification data including the detection information to the vehicle network 26. Furthermore, the detection ECU 16 may execute processing based on the detection information and incorporate a result of the processing in the notification data. For example, in a case where the acceleration sensor 42 detects the acceleration rate being higher than a threshold of detection of a collision, the detection ECU 16 may make a determination that a collision has been detected. The detection ECU 16 may incorporate the result of the determination in the notification data. The detection ECU 16 may extract a moving body such as the passenger 3 or the surrounding automobile 2 that are present around the automobile 1, on the basis of the image of the external camera 43. The detection ECU 16 may determine a kind and attributes of the moving body, and make estimation of a relative direction, a relative distance, and a direction of movement of the moving body in accordance with a position, a size, and a change of the moving body in the image. The detection ECU 16 may incorporate information regarding the moving body including a result of the estimation in the notification data and output the notification data to the vehicle network 26.

The automated driving and driver assistance ECU 14 may acquire the notification data from the vehicle network 26 and switch a travel control state of the automobile 1 between the automated driving and the manual driving.

Moreover, the automated driving and driver assistance ECU 14 may acquire the notification data from the vehicle network 26, execute a control for the automated driving or driver assistance of the automobile 1, and generate travel control data to output the travel control data to the driving ECU 11, the steering ECU 12, and the braking ECU 13. The driving ECU 11, the steering ECU 12, and the braking ECU 13 may control the travel of the automobile 1 on the basis of the travel control data to be supplied.

In one embodiment of the technology, the automated driving and driver assistance ECU 14 may serve as a "travel controller".

In one specific but non-limiting example, in performing the automated driving of the automobile 1, the automated driving and driver assistance ECU 14 may acquire the notification data from the vehicle network 26 and search or acquire the path to the destination. The automated driving and driver assistance ECU 14 may acquire the notification data from the vehicle network 26, determine presence or absence of an abnormality or uncertainties in the automobile 1. In a case without any abnormality or uncertainties in the automobile 1, the automated driving and driver assistance ECU 14 may generate the travel control data regarding a course to be traveled along the path, and output the generated travel control data as the notification data. The automated driving and driver assistance ECU 14 may control the travel of the automobile 1 on the basis of positional information of the automobile 1 from, for example, the GPS receiver 44, to allow the automobile 1 to travel along the path of its movement until an arrival at the destination, i.e., until the automobile 1 stops, for example, in a parking lot at the destination. In a case with an abnormality or uncertainties with respect to the automobile 1, the automated driving and driver assistance ECU 14 may generate the travel control data to avoid the abnormality or the uncertainties, and output the generated travel control data as the notification data.

In assisting with driving of the automobile 1, the automated driving and driver assistance ECU 14 may acquire the notification data regarding the operation input from the UI operation ECU 18 through the vehicle network 26. The automated driving and driver assistance ECU 14 may generate the travel control data in which an operation based on the operation input is adjusted, and output the travel control data as the notification data. The automated driving and driver assistance ECU 14 may control the travel of the automobile 1 in accordance with a driving operation by the occupant. In a case with an abnormality or uncertainties with respect to the automobile 1, the automated driving and driver assistance ECU 14 may generate the travel control data to avoid the abnormality or the uncertainties, and output the generated travel control data as the notification data.

To the lamp ECU 19, coupled may be head lamps 51, turn signal lamps 52, stop lamps 53, and the automated driving indicator lamp 5. The head lamps 51 may be provided in a front part of the vehicle body 6 of the automobile 1. The turn signal lamps 52 may be provided on front right, front rear, rear right, and rear left corners of the vehicle body 6. The stop lamps 53 may be provided in a rear part of the vehicle body 6. Moreover, as illustrated in the figure, a memory 59 may be coupled to the lamp ECU 19. The memory 59 coupled to the lamp ECU 19 may hold setting values the lamp ECU 19 uses for a control.

In one embodiment of the technology, the lamp ECU 19 may serve as a "lamp controller".

In one specific but non-limiting example, the lamp ECU 19 may acquire, from the vehicle network 26, the notification data for a lamp control. In accordance with the notification data acquired, the lamp ECU 19 may control lighting states of the head lamps 51, the turn signal lamps 52, the stop lamps 53, and the automated driving indicator lamp 5. For example, in a case where the automated driving and driver assistance ECU 14 is controlling the travel of the automobile 1 by the automated driving, the lamp ECU 19 may switch on the automated driving indicator lamp 5 during the execution of the automated driving. This makes it possible for the moving body outside the automobile 1, e.g., the passenger 3 and the surrounding automobile 2, to visually recognize, with the clue of the illumination of the automated driving indicator lamp 5, that the automobile 1 is executing the automated driving. Hence, it is possible for the moving body outside the automobile 1, e.g., the passenger 3 and the surrounding automobile 2, to cope with the travel of the automobile 1 executing the automated driving. The lamp ECU 19 may perform a lighting control to switch off the automated driving indicator lamp 5, in a case where, for example, travel environment of the automobile 1 renders it unnecessary to switch on the automated driving indicator lamp 5 regardless of the execution of the automated driving.

To the alarm ECU 20, an external speaker 61 may be coupled. The alarm ECU 20 may acquire the notification data regarding an alarm output from the vehicle network 26 and output an alarm sound from the external speaker 61 in response to the notification data thus acquired.

Figure 3:
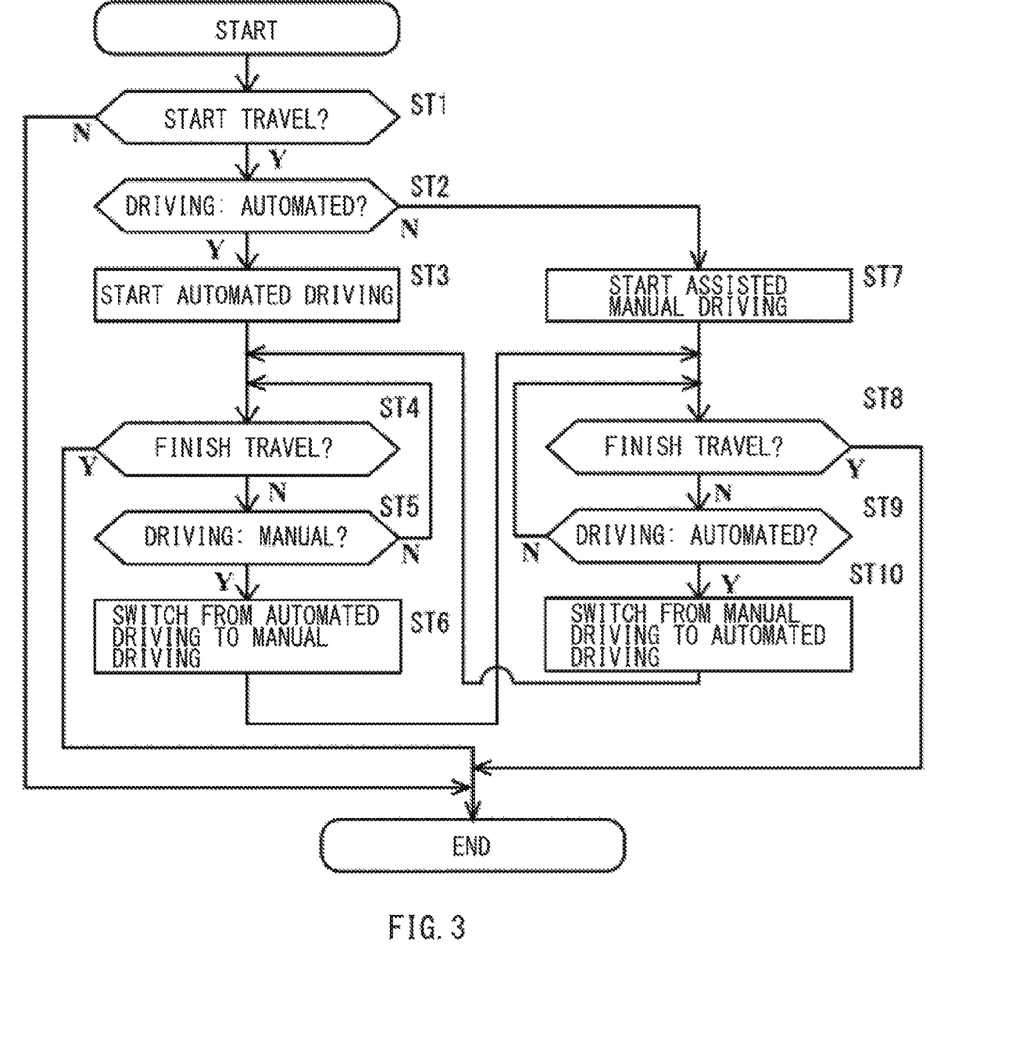
FIG. 3 is a flowchart of a switching control between automated driving and assisted manual driving.

FIG. 3 is a flowchart of a switching control between the automated driving and assisted manual driving. The automated driving and driver assistance ECU 14 may repeatedly execute processing of FIG. 3 in a case where, for example, the passenger 3 rides in the automobile 1.

In step ST1, the automated driving and driver assistance ECU 14 may determine whether or not to start the travel of the automobile 1. In a case where the travel of the automobile 1 is not going to be started (N in step ST1), the automated driving and driver assistance ECU 14 may terminate the processing of FIG. 3. In a case where the travel of the automobile 1 is going to be started (Y in step ST1), the automated driving and driver assistance ECU 14 may cause the processing to proceed to step ST2.

In step ST2, the automated driving and driver assistance ECU 14 may determine whether or not the travel of the automobile 1 is controlled by the automated driving. The automated driving and driver assistance ECU 14 may determine whether or not the travel of the automobile 1 is controlled by the automated driving on the basis of, for example, a setting value of a driving mode acquired from the UI operation ECU 18. In a case where the travel of the automobile 1 is controlled by the automated driving (Y in step ST2), the automated driving and driver assistance ECU 14 may cause the processing to proceed to step ST3. In a case where the travel of the automobile 1 is not controlled by the automated driving but is otherwise controlled, e.g., by the assisted manual driving (N in step ST2), the automated driving and driver assistance ECU 14 may cause the processing to proceed to step ST7.

In step ST3, the automated driving and driver assistance ECU 14 may start the travel by the automated driving. The automated driving and driver assistance ECU 14 may control the travel of the automobile 1 by the automated driving.

In step ST4, the automated driving and driver assistance ECU 14 may determine whether or not to finish the travel of the automobile 1. The automated driving and driver assistance ECU 14 may determine that the travel of the automobile 1 is going to be finished, in a case where the positional information of the automobile 1 indicates that the automobile 1 is stopped, for example, in a parking lot at the destination of the automated driving, with the acceleration rate being zero (0). The positional information of the automobile 1 may be acquired from the external communication ECU 17 or the GPS receiver 44. In a case where the automated driving and driver assistance ECU 14 determines that the travel of the automobile 1 is going to be finished (Y in step ST4), the automated driving and driver assistance ECU 14 may terminate the processing of FIG. 3. Thus, the travel by the automated driving is finished. In a case where the automated driving and driver assistance ECU 14 does not determine that the travel of the automobile 1 is going to be finished (N in step ST4), the automated driving and driver assistance ECU 14 may cause the processing to proceed to step ST5.

In step ST5, the automated driving and driver assistance ECU 14 may determine whether or not to switch the travel of the automobile 1 from the automated driving to otherwise than the automated driving, e.g., the manual driving. The automated driving and driver assistance ECU 14 may determine that the travel of the automobile 1 is going to be switched from the automated driving, on the basis of, for example, the setting value of the driving mode acquired from the UI operation ECU 18. In a case where the travel of the automobile 1 is not going to be switched from the automated driving to otherwise than the automated driving (N in step ST5), the automated driving and driver assistance ECU 14 may cause the processing to return to step ST4. The automated driving and driver assistance ECU 14 may repeat the determinations of steps ST4 and ST5 while the automated driving is in execution. In a case where the travel of the automobile 1 is going to be switched from the automated driving to otherwise than the automated driving (Y in step ST5), the automated driving and driver assistance ECU 14 may cause the processing to proceed to step ST6.

In step ST6, the automated driving and driver assistance ECU 14 may switch the travel of the automobile 1 from the automated driving to otherwise than the automated driving, e.g., the assisted manual driving. Thus, the travel by the automated driving is finished, and the travel by the manual driving is started. Thereafter, the automated driving and driver assistance ECU 14 may cause the processing to proceed to step ST8.

In step ST7, the automated driving and driver assistance ECU 14 may start the assisted manual driving or otherwise than the automated driving.

In step ST8, the automated driving and driver assistance ECU 14 may determine whether or not to finish the travel of the automobile 1. For example, the automated driving and driver assistance ECU 14 may determine that the travel of the automobile 1 is going to be finished, in a case where the automobile 1 is stopped, with the acceleration rate being zero (0), and an operation is made on an ignition switch of the automobile 1. In a case with a determination that the travel of the automobile 1 is going to be finished (Y in step ST8), the automated driving and driver assistance ECU 14 may terminate the processing of FIG. 3. Thus, the travel by the assisted manual driving is finished. In a case without the determination that the travel of the automobile 1 is going to be finished (N in step ST8), the automated driving and driver assistance ECU 14 may cause the processing to proceed to step ST9.

In step ST9, the automated driving and driver assistance ECU 14 may determine whether or not to switch the travel of the automobile 1 from the assisted manual driving to the automated driving. The automated driving and driver assistance ECU 14 may determine that the travel of the automobile 1 is going to be switched from the assisted manual driving, on the basis of, for example, the setting value of the driving mode acquired from the UI operation ECU 18. In a case where the travel of the automobile 1 is not going to be switched from the assisted manual driving to the automated driving (N in step ST9), the automated driving and driver assistance ECU 14 may cause the processing to return to step ST8. The automated driving and driver assistance ECU 14 may repeat the determinations of steps ST8 and ST9 while the assisted manual driving is in execution. In a case where the travel of the automobile 1 is going to be switched from the assisted manual driving to the automated driving (Y in step ST9), the automated driving and driver assistance ECU 14 may cause the processing to proceed step ST10.

In step ST10, the automated driving and driver assistance ECU 14 may switch the travel of the automobile 1 from the assisted manual driving to the automated driving. Thus, the travel by, for example, the assisted manual driving or otherwise than the automated driving is finished, and the travel by the automated driving is started. Thereafter, the automated driving and driver assistance ECU 14 may cause the processing to proceed to step ST4.

As described, the automated driving and driver assistance ECU 14 may repeatedly execute the processing of FIG. 3, in a case where, for example, the automobile 1 is traveling, with the occupant riding therein. For example, the automated driving and driver assistance ECU 14 may acquire, through the vehicle network 26, the notification data inclusive of setting information of the driving mode from the UI operation ECU 18, and switch the travel of the automobile 1 between the automated driving and the assisted manual driving. Moreover, the automated driving and driver assistance ECU 14 may acquire the notification data inclusive of an instruction to compulsively switch to the manual driving, and switch the travel of the automobile 1 between the automated driving and the assisted manual driving. Such an instruction may be based on, for example, detection of an abnormality from the detection ECU 16. Furthermore, the automated driving and driver assistance ECU 14 itself may generate the notification data inclusive of the instruction based on the detection of an abnormality, to compulsively switch to the manual driving, and switch the travel of the automobile 1 between the automated driving and the assisted manual driving.

Figure 4:
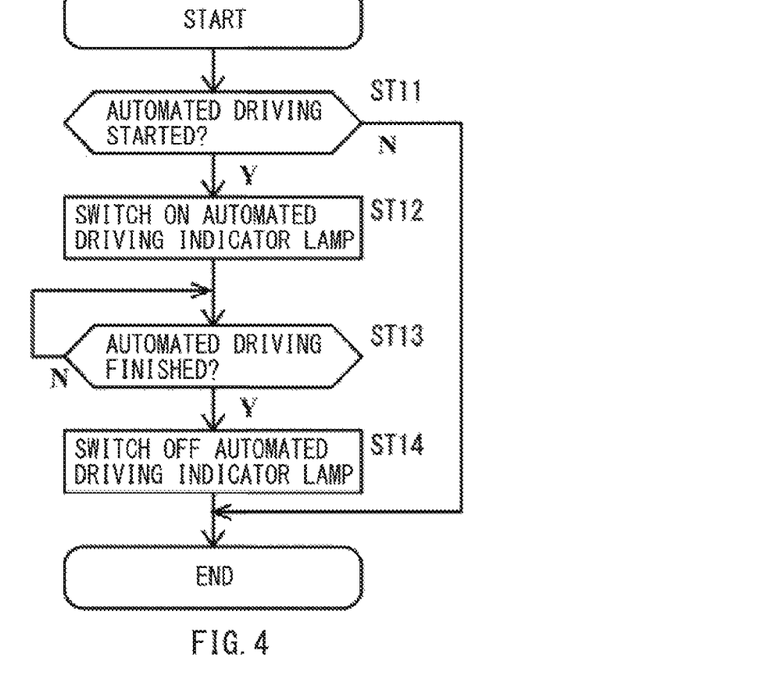
FIG. 4 is a flowchart of a lighting control of an automated driving indicator lamp in accordance with the switching control between the automated driving and the assisted manual driving illustrated in FIG. 3.

FIG. 4 is a flowchart of the lighting control of the automated driving indicator lamp 5 in accordance with the switching control between the automated driving and the assisted manual driving illustrated in FIG. 3.

The lamp ECU 19 may repeatedly execute processing of FIG. 4, while keeping on acquiring, as the notification data, information from the automated driving and driver assistance ECU 14 controlling the travel of the automobile 1.

In step ST11, the lamp ECU 19 may determine whether or not the travel of the automobile 1 by the automated driving has been started. The lamp ECU 19 may acquire, for example, information and/or notification the automated driving and driver assistance ECU 14 outputs to the vehicle network 26 for a control of the automated driving, and determine whether or not the travel of the automobile 1 by the automated driving has been started. In a case where the travel of the automobile 1 by the automated driving has not been started (N in step ST11), the lamp ECU 19 may terminate the processing of FIG. 4. In a case where the travel of the automobile 1 by the automated driving has been started (Y in step ST11), the lamp ECU 19 may cause the processing to proceed to step ST12.

In step ST12, the lamp ECU 19 may switch on the automated driving indicator lamp 5 that has been off.

In step ST13, the lamp ECU 19 may determine whether or not the travel of the automobile 1 by the automated driving has been finished. For example, the lamp ECU 19 may determine whether or not the travel of the automobile 1 by the automated driving has been finished, on the basis of an end of acquisition of the information supplied to the vehicle network 26 from the automated driving and driver assistance ECU 14 for the control of the automated driving. Alternatively, the lamp ECU 19 may determine whether or not the travel of the automobile 1 by the automated driving has been finished, by acquiring notification that the automated driving has been finished. In a case where the travel of the automobile 1 by the automated driving has not been finished (N in step ST13), the lamp ECU 19 may repeat the determination process of step ST13. In a case where the travel of the automobile 1 by the automated driving has been finished (Y in step ST13), the lamp ECU 19 may cause the processing to proceed to step ST14.

In step ST14, the lamp ECU 19 may switch off the automated driving indicator lamp 5 that has been switched on.

As described, the lamp ECU 19 may basically switch on the automated driving indicator lamp 5 during the execution of the automated driving in which the automated driving and driver assistance ECU 14 controls the travel of the automobile 1 by the automated driving.

Figure 5:
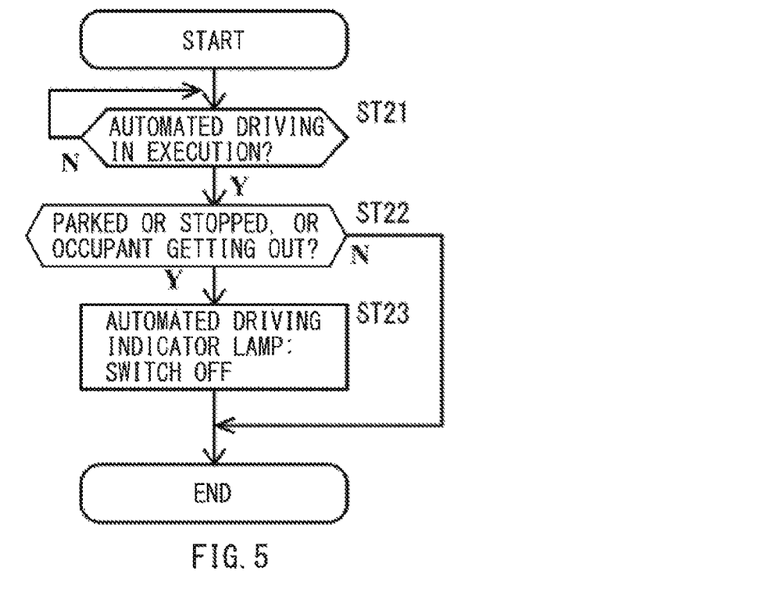
FIG. 5 is a flowchart of a lighting state control of the automated driving indicator lamp during execution of the automated driving, in a case where the automobile is parked or stopped, waiting for a passenger to get out.

FIG. 5 is a flowchart of a lighting state control of the automated driving indicator lamp 5 during the execution of the automated driving, in a case where the automobile 1 is parked or stopped, waiting for the passenger 3 to get out.

The lamp ECU 19 may repeatedly execute processing of FIG. 5, while keeping on acquiring, as the notification data, the information from the automated driving and driver assistance ECU 14 controlling the travel of the automobile 1 by, for example, the automated driving.

In one embodiment of the technology, the lamp ECU 19 may serve as the "lamp controller".

In step ST21, the lamp ECU 19 may determine whether or not the automated driving is in execution. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automated driving is not in execution (N in step ST21), the lamp ECU 19 may repeat the determination process of step ST21 until the automobile 1 is brought to the automated driving. In a case where the automobile 1 is brought to the automated driving (Y in step ST21), the lamp ECU 19 may cause the processing to proceed to step ST22.

In step ST22, the lamp ECU 19 may determine whether or not the automobile 1 travel of which is controlled by the automated driving is parked or stopped, for example, waiting for the passenger 3 to get out. In a case where, for example, the speed detected by the speed sensor 41 or the acceleration rate detected by the acceleration sensor 42 is equal to or greater than a predetermined value, the lamp ECU 19 may determine that the automobile 1 is not parked or stopped (N in step ST22), and terminate the processing of FIG. 5. In a case where the automobile 1 is parked or stopped (Y in step ST22), the lamp ECU 19 may cause the processing to proceed to step ST23.

In step ST23, the lamp ECU 19 may switch off the automated driving indicator lamp 5 that has been on while the automobile 1 is traveling by the automated driving. Hence, it is possible to keep the automated driving indicator lamp 5 off in the case where the automobile 1 is parked or stopped.

Figure 6:
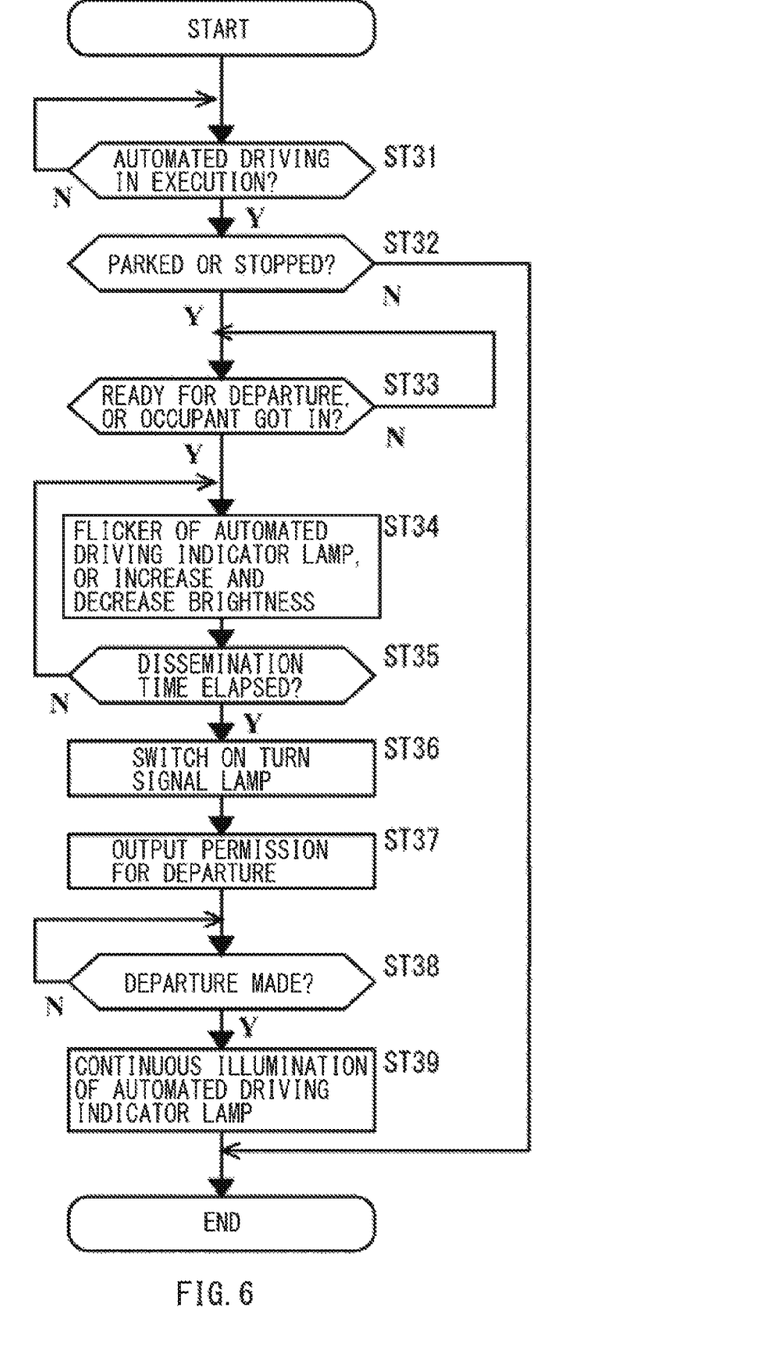
FIG. 6 is a flowchart of the lighting state control of the automated driving indicator lamp, in a case where the automobile makes a departure by the automated driving from a parked or stopped state after the passenger gets in, according to a first embodiment of the technology.

FIG. 6 is a flowchart of the lighting state control of the automated driving indicator lamp 5, in a case where the automobile 1 makes a departure by the automated driving from the parked or stopped state, after the passenger 3 gets in.

The lamp ECU 19 may repeatedly execute processing of FIG. 6, while keeping on acquiring, as the notification data, the information from the automated driving and driver assistance ECU 14 controlling the travel of the automobile 1 by, for example, the automated driving.

In one embodiment of the technology, the lamp ECU 19 may serve as the "lamp controller".

In step ST31, the lamp ECU 19 may determine whether or not the automobile 1 is executing the automated driving. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automobile 1 is not executing the automated driving (N in step ST31), the lamp ECU 19 may repeat the determination process of step ST31 until the automobile 1 is brought to the automated driving. In a case where the automobile 1 is brought to the automated driving (Y in step ST31), the lamp ECU 19 may cause the processing to proceed to step ST32. Moreover, in a case where the automobile 1 parked or stopped has been switched to the automated driving, the lamp ECU 19 may determine that the automobile 1 has been brought to the automated driving (Y in step ST31), and cause the processing to proceed to step ST32.

In step ST32, the lamp ECU 19 may determine whether or not the automobile 1 is parked or stopped. In a case where, for example, the speed detected by the speed sensor 41 or the acceleration rate detected by the acceleration sensor 42 is equal to or greater than a predetermined value, the lamp ECU 19 may determine that the automobile 1 is not parked or stopped (N in step ST32), and terminate the processing of FIG. 6. In a case where the automobile 1 is parked or stopped (Y in step ST32), the lamp ECU 19 may cause the processing to proceed to step ST33.

In step ST33, the lamp ECU 19 may determine whether or not the automobile 1 parked or stopped by the automated driving is ready for a departure. The lamp ECU 19 may determine whether or not the automobile 1 is ready for the departure, on the basis of whether or not the detection ECU 16 detects a new passenger has got in the automobile 1 parked or stopped by the automated driving. In a case where the automobile 1 parked or stopped by the automated driving is not ready for the departure (N in step ST33), the lamp ECU 19 may repeat the determination process of step ST33. In a case where the automobile 1 parked or stopped by the automated driving becomes ready for the departure (Y in step ST33), the lamp ECU 19 may cause the processing to proceed to step ST34.

In step ST34, the lamp ECU 19 may start the lighting control of the automated driving indicator lamp 5 that has been off while the automobile 1 is parked or stopped by the automated driving, and cause flicker of the automated driving indicator lamp 5. Thus, the automated driving indicator lamp 5 becomes on in a first lighting state in which, for example, the lamp ECU 19 may increase and decrease brightness of the automated driving indicator lamp 5.

In step ST35, the lamp ECU 19 may determine whether or not a duration of lighting in the first lighting state has continued for predetermined dissemination time. The first lighting state may include causing the flicker of the automated driving indicator lamp 5. In a case where the dissemination time has not elapsed (N in step ST35), the lamp ECU 19 may cause the processing to return to step ST34, and continue the flicker of the automated driving indicator lamp 5. In a case where the dissemination time has elapsed (Y in step ST35), the lamp ECU 19 may cause the processing to proceed to step ST36.

In step ST36, the lamp ECU 19 may switch on the turn signal lamp 52. The turn signal lamps 52 may serve as part of a lamp system of the automobile 1. The lamp ECU 19 may switch on whichever of the turn signal lamps 52 is installed in a direction of the departure of the automobile 1.

In step ST37, the lamp ECU 19 may output a permission for the departure after switching on the automated driving indicator lamp 5. As described later, the automated driving and driver assistance ECU 14 may start the travel of the automobile 1 by the automated driving, on the basis of the permission for the departure by the lamp ECU 19.

In step ST38, the lamp ECU 19 may determine whether or not the automobile 1 has made the departure and started travelling. In a case where, for example, the speed detected by the speed sensor 41 or the acceleration rate detected by the acceleration sensor 42 is smaller than a predetermined value, the lamp ECU 19 may determine that the automobile 1 has not made the departure nor started travelling (N in step ST38), and repeat the determination process of step ST38. In a case where the automobile 1 has made the departure and started travelling (Y in step ST38), the lamp ECU 19 may cause the processing to proceed to step ST39.

In step ST39, after the automobile 1 made the departure by the automated driving, the lamp ECU 19 may switch the lighting state of the automated driving indicator lamp 5 to a second lighting state different from the first lighting state. In the second lighting state, the lamp ECU 19 may cause continuous illumination of the automated driving indicator lamp 5 with constant brightness.

Figure 7:
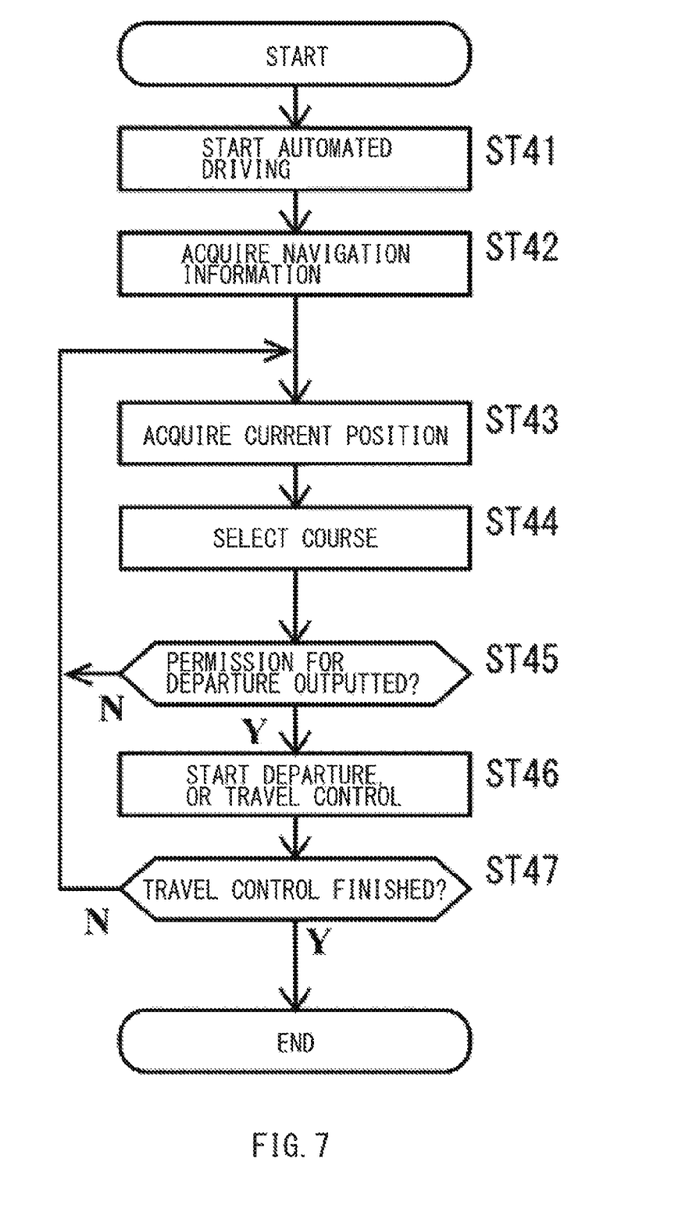
FIG. 7 is a flowchart of a travel control that includes allowing the automobile to make the departure by the automated driving from the parked or stopped state.

FIG. 7 is a flowchart of a travel control that includes allowing the automobile 1 to make the departure by the automated driving from the parked or stopped state.

The automated driving and driver assistance ECU 14 may repeatedly execute processing of FIG. 7, in the case where the travel control state of the automobile 1 is set to the automated driving in the processing of FIG. 3.

In step ST41, the automated driving and driver assistance ECU 14 may start the travel control that includes allowing the automobile 1 to travel by the automated driving.

In step ST42, the automated driving and driver assistance ECU 14 may acquire navigation information such as a path to be traveled by the automobile 1 by the automated driving. The automated driving and driver assistance ECU 14 may acquire the navigation information as the notification data from the various control ECUs of the automobile 1, e.g., the external communication ECU 17, through the vehicle network 26.

In step ST43, the automated driving and driver assistance ECU 14 may acquire the current position of the automobile 1. The automated driving and driver assistance ECU 14 may acquire, as the notification data, information regarding the current position of the automobile 1 from the various control ECUs of the automobile 1, e.g., the detection ECU 16, through the vehicle network 26.

In step ST44, the automated driving and driver assistance ECU 14 may select a course from the current position on the acquired path. Thus, the automated driving and driver assistance ECU 14 becomes ready for a start of the travel control of the automobile 1 by the automated driving along the selected course.

In step ST45, the automated driving and driver assistance ECU 14 may determine presence or absence of the permission for the departure. In a case where the lamp ECU 19 has not outputted the permission for the departure in step ST37 (N in step ST45), the automated driving and driver assistance ECU 14 may cause the processing to return to step ST43. The automated driving and driver assistance ECU 14 may repeat the processes of steps ST43 to ST45 until the lamp ECU 19 outputs the permission for the departure. In a case with the presence of the permission for the departure outputted by the lamp ECU 19 (Y in step ST45), the automated driving and driver assistance ECU 14 may cause the processing to proceed to step ST46.

In step ST46, the automated driving and driver assistance ECU 14 may start the travel control along the latest course selected in step ST44. Thus, the automobile 1 makes the departure by the automated driving and starts travelling.

In step ST47, the automated driving and driver assistance ECU 14 may determine whether or not the travel control by the automated driving has been finished. In a case where, for example, the automobile 1 arrives at the destination, the automated driving and driver assistance ECU 14 may determine that the travel control by the automated driving has been finished. In a case where the travel control by the automated driving has not been finished (N in step ST47), the automated driving and driver assistance ECU 14 may cause the processing to return to step ST43. The automated driving and driver assistance ECU 14 may repeat the processes of steps ST43 to ST47 until, for example, the automobile 1 arrives at the destination. In a case where, for example, the automobile 1 has arrived at the destination, and the automated driving and driver assistance ECU 14 determines that the travel control by the automated driving has been finished (Y in step ST47), the automated driving and driver assistance ECU 14 may terminate the processing of FIG. 7.

As described, the automated driving and driver assistance ECU 14 may acquire the permission for the departure from the lamp ECU 19, and thereafter, start a departure control by the automated driving, as to the automobile 1 parked or stopped.

As described, in this embodiment, the lamp ECU 19 is configured to switch on the automated driving indicator lamp 5 to indicate that the travel control state is the automated driving, during the execution of the automated driving in which the automated driving and driver assistance ECU 14 controls the travel of the automobile 1 by the automated driving. The lamp ECU 19 is configured to start the lighting control of the automated driving indicator lamp 5 that has been off, before the automobile 1 makes the departure by the automated driving, in the case where the automobile 1 is about to make the departure by the automated driving from the parked or stopped state with the automated driving indicator lamp 5 off.

For example, in the case where the automobile 1 in the parked or stopped state becomes ready for the departure, with an occupant having got in, the lamp ECU 19 may start the lighting control of the automated driving indicator lamp 5 that has been off, before the automobile 1 starts the departure by the automated driving.

The automated driving indicator lamp 5 being switched on before the automobile 1 starts traveling makes it possible for those around the automobile 1, e.g., pedestrians and the surrounding automobile 2, to recognize in advance, before the automobile 1 starts traveling, that the automobile 1 is going to start traveling soon. Hence, it is possible for those around the automobile 1 to prepare for and cope with the start of the travel of the automobile 1, before the automobile 1 actually starts traveling.

In particular, in this embodiment, in the case where the automobile 1 is about to make the departure by the automated driving from the parked or stopped state with the automated driving indicator lamp 5 off, the lamp ECU 19 is configured to control the automated driving indicator lamp 5 to the first lighting state for the predetermined dissemination time until the automobile 1 makes the departure by the automated driving. In the first lighting state, the lamp ECU 19 may increase and decrease the brightness of the automated driving indicator lamp 5, or extend and contract an illumination range of the automated driving indicator lamp 5, or both. Hence, it is possible for those around the automobile 1, e.g., pedestrians and the surrounding automobile 2, to recognize, in the dissemination time, that the automobile 1 is going to start traveling soon, with the clue of the automated driving indicator lamp 5 being switched on. Hence, it is possible for those around the automobile 1 to prepare for and cope with the start of the travel of the automobile 1, before the automobile 1 actually starts traveling.

In this embodiment, after the automobile 1 makes the departure by the automated driving, the lamp ECU 19 is configured to switch the automated driving indicator lamp 5 to the second lighting state different from the first lighting state. In the second lighting state, the lamp ECU 19 may cause the continuous illumination of the automated driving indicator lamp 5 with the constant brightness. Thus, the automated driving indicator lamp 5 is on in the first lighting state until the automobile 1 actually starts traveling by the automated driving, and is switched to the second lighting state after the automobile 1 actually starts traveling by the automated driving. The automated driving indicator lamp 5 indicates that the automated driving is in execution. Switching the lighting state of the automated driving indicator lamp 5 to the second lighting state, e.g., the continuous illumination, during the execution of the automated driving makes it possible for those around the automobile 1 on travel, e.g., persons or the surrounding automobile 2, to easily visually recognize that the automobile 1 in the parked or stopped state has started the departure by the automated driving.

In this embodiment, the lamp ECU 19 may output the permission for the departure after switching on the automated driving indicator lamp 5. The automated driving and driver assistance ECU 14 may acquire the permission for the departure, and thereafter, start the departure control by the automated driving as to the automobile 1 in the parked or stopped state. Hence, in this embodiment, it is possible to ensure that the automated driving indicator lamp 5 is switched on before the automobile 1 actually makes the departure from the parked or stopped state. It is possible to surely allow the automated driving indicator lamp 5 to be switched on in advance before the departure of the automobile 1.

Second Embodiment

Description is given next of the automobile 1 according to a second embodiment of the technology. In the following description, differences from the forgoing embodiment are mainly described. Similar constituent elements to those of the forgoing embodiment are denoted by the same reference numerals as those of the forgoing embodiment, and description thereof is omitted.

Figure 8:
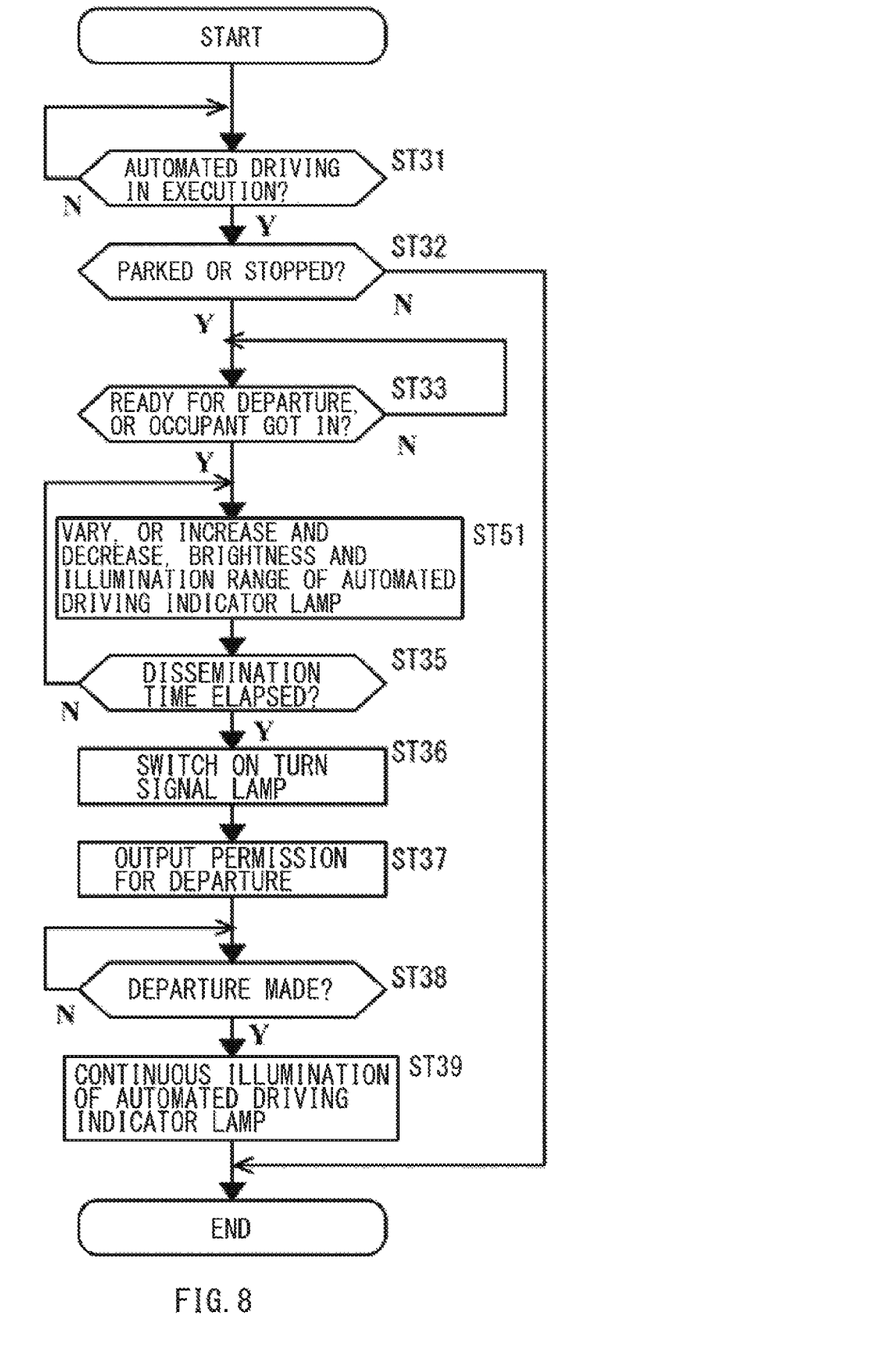
FIG. 8 is a flowchart of the lighting state control of the automated driving indicator lamp, in the case where the automobile makes the departure by the automated driving from the parked or stopped state after the passenger gets in, according to a second embodiment of the technology.

FIG. 8 is a flowchart of the lighting state control of the automated driving indicator lamp 5, in a case where the automobile 1 makes the departure by the automated driving from the parked or stopped state after the passenger gets in, according to the second embodiment of the technology.

The lamp ECU 19 may repeatedly execute processing of FIG. 8, while keeping on acquiring, as the notification data, the information from the automated driving and driver assistance ECU 14 controlling the travel of the automobile 1 by, for example, the automated driving.

In one embodiment of the technology, the lamp ECU 19 may serve as the "lamp controller".

In step ST33, in the case where the automobile 1 parked or stopped by the automated driving becomes ready for the departure (Y in step ST33), the lamp ECU 19 may cause the processing to proceed to step ST51.

In step ST51, the lamp ECU 19 may start the lighting control of the automated driving indicator lamp 5 that has been off while the automobile 1 is parked or stopped by the automated driving. The lamp ECU 19 may start to switch on the automated driving indicator lamp 5 that has been off while the automobile 1 is parked or stopped, while varying the brightness and the illumination range of the automated driving indicator lamp 5. The lamp ECU 19 may increase and decrease the brightness of the automated driving indicator lamp 5, or extend and contract the illumination range of the automated driving indicator lamp 5, or both. Thereafter, the lamp ECU 19 may continue the first lighting state by step ST51 until the duration of lighting in the first lighting state becomes longer than the dissemination time. Furthermore, after the automobile 1 makes the departure by the automated driving, the lamp ECU 19 may switch the lighting state of the automated driving indicator lamp 5 to the second lighting state different from the first lighting state. In the second lighting state, the lamp ECU 19 may cause the continuous illumination of the automated driving indicator lamp 5 with the constant brightness.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing embodiments, the lamp ECU 19 may output the permission for the departure after starting to switch on the automated driving indicator lamp 5. The automated driving and driver assistance ECU 14 may acquire the permission for the departure, and thereafter, start the departure control by the automated driving as to the automobile 1 in the parked or stopped state. Hence, it is possible for the automated driving and driver assistance ECU 14 to start the departure of the automobile 1, with the automated driving indicator lamp 5 on.

In an alternative, for example, the automated driving and driver assistance ECU 14 may take a certain period of waiting time after, for example, step ST44. After an elapse of the waiting time, the automated driving and driver assistance ECU 14 may start the departure of the automobile 1. In this case as well, it is possible to expect the lamp ECU 19 to start to switch on the automated driving indicator lamp 5 in the waiting time. Hence, it is possible to start the departure of the automobile 1, with the automated driving indicator lamp 5 on.

The automated driving and driver assistance ECU 14 and the lamp ECU 19 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the automated driving and driver assistance ECU 14 and the lamp ECU 19. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the automated driving and driver assistance ECU 14 and the lamp ECU 19 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle configured to travel based on a travel mode, the travel mode switching between an automated driving mode and a manual driving mode, the vehicle comprising:
    an automated driving indicator lamp mounted on the vehicle to be visually recognized from outside the vehicle; and
    a lamp controller configured to:
        determine the travel mode of the vehicle;
        determine a state of the vehicle; and
        control a lighting state of the automated driving indicator lamp among a first lighting state, a second lighting state, and a third lighting state based on the determined state of the vehicle and the determined travel mode of the vehicle,
    wherein the first lighting state, the second lighting state, and the third lighting state differ from one another,
    wherein, in response to determining i) that the vehicle is in the automated driving mode and ii) that the vehicle is in a parked or stopped state and is ready to move from the parked or stopped state, the lamp controller controls the lighting state of the automated driving indicator lamp to switch from the first lighting state to the second lighting state,
    wherein, in response to determining that the vehicle in the automated driving mode moves from the parked or stopped state, the lamp controller controls the lighting state of the automated driving indicator lamp to switch from the second lighting state to the third lighting state, and
    wherein, when a predetermined period of time elapses after the automated driving indicator lamp is switched to the second lighting state from the first lighting state and prior to the automated driving indicator lamp is switched to the third lighting state from the second lighting state, the lamp controller controls a turning signal lamp installed on a side of the vehicle closer to a direction of departure of the vehicle.

2. The vehicle according to claim 1, further comprising one or more sensors that detect a passenger present around the vehicle,
    wherein the lamp controller determines that the vehicle is ready to move from the parked or stopped state based on detecting a passenger boarding the vehicle while the vehicle is in the parked or stopped state.

3. The vehicle according to claim 1,
    wherein, in the first lighting state, the automated driving indicator lamp is turned off such that the automated driving indicator lamp is continuously turned off.

4. The vehicle according to claim 2, wherein, in the first lighting state, the automated driving indicator lamp is turned off such that the automated driving indicator lamp is continuously turned off.

5. The vehicle according to claim 3, wherein, in the second lighting state, i) the automated driving indicator lamp is alternatively turned on and off to flicker, ii) a brightness of the automated driving indicator lamp increases and decreases, iii) an illumination area of the automated driving indicator lamp increases and decreases, or iv) the brightness of the automated driving indicator lamp increases and decreases as the illumination area of the automated driving indicator lamp increases and decreases.

6. The vehicle according to claim 4, wherein, in the second lighting state, i) the automated driving indicator lamp is alternatively turned on and off to flicker, ii) a brightness of the automated driving indicator lamp increases and decreases, iii) an illumination area of the automated driving indicator lamp increases and decreases, or iv) the brightness of the automated driving indicator lamp increases and decreases as the illumination area of the automated driving indicator lamp increases and decreases.

7. The vehicle according to claim 5, wherein, in the third lighting state, the automated driving indicator lamp is turned on for continuous illumination.

8. The vehicle according to claim 6, wherein, in the third lighting state, the automated driving indicator lamp is turned on for continuous illumination.

* * * * *